United States Patent
Savla et al.

(10) Patent No.: US 10,909,118 B2
(45) Date of Patent: Feb. 2, 2021

(54) CACHE OPTIMIZATION FOR MISSING DATA

(71) Applicant: salesforce.com, inc., San Francisco, CA (US)

(72) Inventors: Pallavi Savla, San Jose, CA (US); Gurdeep Singh Sandle, Foster City, CA (US); George Vitchev, Santa Clara, CA (US); Prabhjot Singh, Fremont, CA (US); Steven Marshall Cohen, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 887 days.

(21) Appl. No.: 15/015,845

(22) Filed: Feb. 4, 2016

(65) Prior Publication Data
US 2017/0228391 A1     Aug. 10, 2017

(51) Int. Cl.
*G06F 16/2455*     (2019.01)
*G06F 12/0871*     (2016.01)

(52) U.S. Cl.
CPC .... *G06F 16/24552* (2019.01); *G06F 12/0871* (2013.01); *G06F 2212/163* (2013.01)

(58) Field of Classification Search
CPC ......... G06F 17/30902; G06F 17/30286; G06F 17/30569; G06F 17/30306; G06F 17/30345
See application file for complete search history.

(56) References Cited

U.S. PATENT DOCUMENTS

| | | | |
|---|---|---|---|
| 5,577,188 A | 11/1996 | Zhu | |
| 5,606,688 A * | 2/1997 | McNutt | G06F 12/0866 711/113 |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |

(Continued)

OTHER PUBLICATIONS

U.S. Appl. No. 13/986,251, filed Apr. 16, 2013.

*Primary Examiner* — Dawaune A Conyers
(74) *Attorney, Agent, or Firm* — Dergosits & Noah LLP; Todd A. Noah

(57) ABSTRACT

Cache optimization for missing data is provided. A database system receives a first request for a database record. The database system determines whether the database record is stored in a cache. The database system determines whether the database record is stored in a data store in response to a determination that the database record is not stored in the cache. The database system stores a dummy entry for the database record in the cache in response to a determination that the database record is not stored in the data store. The database system receives a second request for the database record. The database system determines whether the database record is stored in the cache. The database system outputs an indication that the database record is unavailable in response to a determination that the dummy entry stored for the database record is in the cache.

12 Claims, 3 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129177 A1* | 9/2002 | McGuire .......... G06F 9/44521 719/315 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0080830 A1* | 4/2007 | Sacks .................. G06F 3/147 340/995.1 |
| 2007/0157200 A1* | 7/2007 | Hopkins .................. G06F 9/52 718/100 |
| 2008/0098454 A1* | 4/2008 | Toh .................. H04L 41/0622 726/1 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0121916 A1* | 5/2010 | Lin ...................... G06F 21/554 709/203 |
| 2011/0078219 A1* | 3/2011 | Dodge ............. G06F 17/30132 707/822 |
| 2011/0302266 A1* | 12/2011 | Lowery ............ G06F 17/30902 709/214 |
| 2012/0072470 A1* | 3/2012 | Joseph ............. G06F 16/24552 707/812 |
| 2012/0233137 A1 | 9/2012 | Jakobson et al. |
| 2013/0111506 A1* | 5/2013 | Guddanti .......... G06F 17/30902 719/328 |
| 2013/0132663 A1* | 5/2013 | Eleftheriou ......... G06F 12/0866 711/111 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0215156 A1* | 7/2014 | Park ................... G06F 12/0888 711/119 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0149635 A1* | 5/2015 | Rajagopalan ....... H04L 67/1014 709/226 |

(56) References Cited

U.S. PATENT DOCUMENTS

2015/0172563 A1    6/2015  Jakobson et al.
2016/0205213 A1*   7/2016  Kolam .................... H04L 67/32
                                                        709/218
2016/0342654 A1*  11/2016  Bendel .............. G06F 17/30463

* cited by examiner

CACHE OPTIMIZATION FOR MISSING DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A cache is a computer component that stores data so that future requests for that data can be served faster. The data stored in a cache may be the duplicate of data stored elsewhere or the result of an earlier computation. Reading data from a cache is faster than reading from another data store or re-computing a result. Thus, the more requests that can be served from a cache, the faster a system performs. To be cost-effective and to enable efficient use of data, caches are relatively small. Nevertheless, caches have proven themselves in many areas of computing because access patterns in typical computer applications exhibit frequent referencing of the same data. Hardware implements a cache as a block of memory for temporary storage of data likely to be used again. Hardware may implement a data store other than cache as a hard disk drive, a more slowly accessed block of memory, or any other type of storage which is more slowly accessed than the cache is accessed.

A database system may store requested database records in a cache to enable faster access for future requests. When a database record is requested, the database system first determines whether the requested database record is already stored in the cache. If the requested database record is already stored in the cache, the database system responds to the request with the requested database record which is quickly accessed from the cache. If the requested database record is not already stored in the cache, then the database system determines whether the requested database record is stored in the slower-accessed data store. If the requested database record is stored in the in the slower-accessed data store, the database system responds to the request with the requested database record which is slowly accessed from the data store, and then stores the requested database record in the cache to enable faster access for future requests. If many requests are received for a database record that is unavailable in both the cache and the slower-accessed data store, the database system will access both the cache and the slower-accessed data store in response to each of the many requests. A significantly large number of accesses to the slower-accessed data store may cause the database system to function more slowly or not at all.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
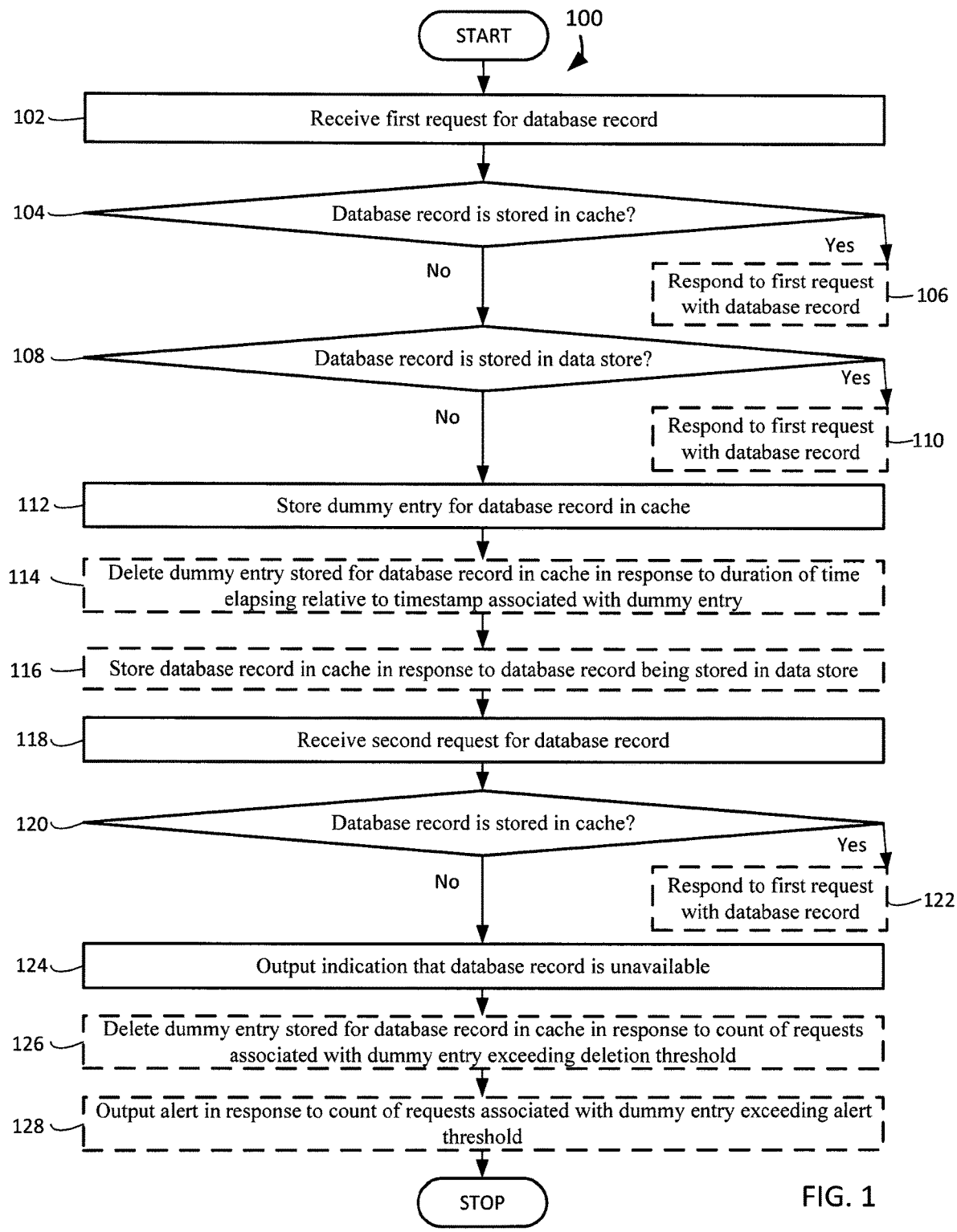
FIG. 1 depicts an operational flow diagram illustrating a high level overview of a method for cache optimization for missing data, in an embodiment.

Systems and methods are provided for cache optimization for missing data. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for cache optimization for missing data will be described with reference to example embodiments. The following detailed description will first describe a method for cache optimization for missing data.

In accordance with embodiments described herein, there are provided methods and systems for cache optimization for missing data. A database system receives a first request for a database record, and determines whether the requested database record is already stored in a cache. If the requested database record is not already stored in the cache, the database system determines whether the requested database record is stored in a data store. If the requested database record is not stored in the data store, the database system stores a dummy entry for the requested database record in the cache. The database system receives a second request for the database record, and determines whether the requested database record is already stored in the cache. Since the dummy entry is stored for the requested database record in the cache, the database system outputs an indication that the requested database record is unavailable, without having to access the data store.

For example, a database system receives a first request identifying a record for an Acme Corporation employee named John Smith, and determines whether Smith's Acme Corporation record is already stored in the database system's cache. If Smith's Acme Corporation record is not already stored in the database system's cache, the database system determines whether Smith's Acme Corporation record is stored in the database system's data store. If Smith's Acme Corporation record is not stored in the database system's data store, the database system stores a dummy entry for Smith's Acme Corporation record in the database system's cache. After receiving a second request for Smith's Acme Corporation record, the database system determines whether Smith's Acme Corporation record is stored in the database system's cache. Since the dummy entry is stored for Smith's Acme Corporation record in the database system's cache, the database system outputs an indication that Smith's Acme Corporation record is unavailable, without having to access the database system's slower accessed data store. The database system stores a dummy entry in the database system's cache to enable faster responses to requests for data records already determined to be unavailable in the database system, and to protect the database system from any potential problems that may be caused by repeatedly accessing the database system's slow-access data store for any database record previously determined to be unavailable.

While one or more implementations and techniques are described with reference to an embodiment in which cache optimization for missing data is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for cache optimization for missing data. A database system receives a first request for a database record, block 102. For example and without limitation, this can include the database system receiving a request identifying a record which stores John as a person's given name, Smith as the person's family name, and Acme Corporation as the person's employer. The request may explicitly specify a particular record identifier, or provide information that may be used by the database system to identify a particular record. Although this example describes the database system receiving a request for a single database record, the database system may receive a request for any number of database records.

After receiving the first request for the database record, the database system determines whether the database record is stored in a cache, block 104. By way of example and without limitation, this can include the database system initially determining whether Smith's Acme Corporation record is already stored in the database system's cache. If the database record is stored in the cache, the method 100 continues to block 106 to respond to the first request with the database record. If the database record is not stored in the cache, the method 100 proceeds to block 108 to determine whether the database record is stored in the data store.

If the database record is stored in the cache, the database system optionally responds to the first request with the database record, block 106. In embodiments, this can include the database system responding to the first request with Smith's Acme Corporation record, which was quickly accessed from the database system's cache. Then the method 100 terminates.

If the database record is not stored in the cache, the database system determines whether the database record is stored in a data store, block 108. For example and without limitation, this can include the database system determining whether Smith's Acme Corporation record is stored on one of the database system's hard disk drives because Smith's Acme Corporation record is not stored in the database system's cache. The database system may not store Smith's Acme Corporation record in the database system's cache even if the database system stores Smith's Acme Corporation record on one of the database system's hard disk drives because the database system has yet to receive a request for Smith's Acme Corporation record. If the database record is stored in the data store, the method 100 continues to block 110 to respond to the first request with the database record. If the database record is not stored in the data store, the method 100 proceeds to block 112 to store a dummy entry for the database record in the cache.

If the database record is stored in the data store, the database system optionally responds to the first request with the database record, block 110. By way of example and without limitation, this can include the database system responding to the first request with Smith's Acme Corporation record, which was slowly accessed from one of the database system's hard disk drives, and then storing Smith's Acme Corporation record in the cache. Then the method 100 terminates.

If the database record is not stored in the data store, the database system stores a dummy entry for the database record in the cache, block 112. In embodiments, this can include the database system storing a dummy entry for Smith's Acme Corporation record in the cache because Smith's Acme Corporation record is not stored on any of the database system's hard disk drives. The dummy entry for Smith's Acme Corporation record stores information, such as John as a person's given name, Smith as the person's family name, and Acme Corporation as the person's employer, which enables the database system to identify this dummy entry in the cache in response to subsequent requests for Smith's Acme Corporation record. The database system may not store Smith's Acme Corporation record in any of the database system's hard disk drives because John Smith just started working for Acme Corporation and Smith's Acme Corporation record is not available yet for the system users who want to contact Smith at his new job.

Alternatively, the database system may not store Smith's Acme Corporation record in any of the database system's hard disk drives because Acme Corporation does not have such an employee, but a malicious system user is attempting to harm the database system by programming his own software to repeatedly and rapidly request information for a fictitious employee. Although this example describes the database system as storing a dummy entry for a single database record in the database system's cache, the database system may store dummy entries for any number of database records in the database system's cache.

After storing a dummy entry for the database record in the cache, the database system optionally deletes the dummy entry stored for the database record in the cache in response to a duration of time elapsing relative to a timestamp associated with the dummy entry, block 114. For example and without limitation, this can include the database system deleting the dummy entry for Smith's Acme Corporation record 5 minutes after the time recorded in the timestamp for the dummy entry. This dummy entry deletion enables the database system to check whether any of the database system's data store has stored the database record within the last 5 minutes, after this dummy entry protected the database system from any potential problems that may have been caused during the last 5 minutes by repeatedly accessing the database system's slow-access data store for the database record previously determined to be unavailable. Although these examples describe 5 minutes as the duration of time elapsing, this duration of time may be any amount of time.

After storing a dummy entry for the database record in the cache, the database system optionally stores the database record in the cache in response to the database record being stored in the data store, block 116. By way of example and without limitation, this can include the database system storing Smith's Acme Corporation record on one of the database system's hard disk drives, determining that a dummy entry has been stored in the database system's cache for Smith's Acme Corporation record, and then storing Smith's Acme Corporation record to replace this dummy entry in the database system's cache. This updating of cache with the database record newly stored on a hard disk drive enables the database system to respond to subsequent requests for this newly stored database record without having to wait for the dummy entry to be deleted from the cache.

After storing a dummy entry for the database record in the cache, the database system receives a second request for the database record, block 118. In embodiments, this can include the database system receiving a second request for Smith's Acme Corporation record.

After receiving the second request for the database record, the database system determines whether the database record is stored in the cache, block 120. For example and without limitation, this can include the database system determining whether Smith's Acme Corporation record is stored in the database system's cache. If the database record is stored in the cache, the method 100 continues to block 122 to respond to the second request with the database record. If the database record is not stored in the cache, the method 100 proceeds to block 124 to output an indication that the database record is unavailable in the database system.

If the database record is stored in the cache, the database system optionally responds to the second request with the database record, block 122. By way of example and without limitation, this can include the database system responding to the second request with Smith's Acme Corporation record, which was stored in the database system's cache after the dummy entry for this database record was either deleted or replaced. Then the method 100 terminates.

If the dummy entry is stored for the database record in the cache, the database system outputs an indication that the database record is unavailable, block 124. In embodiments, this can include the database system outputting an indication that Smith's Acme Corporation record is unavailable in the database system because a dummy entry is stored for Smith's Acme Corporation record in the database system's cache, without having to access any of the database system's slow access hard disk drives. The dummy entry for Smith's Acme Corporation record stored information, such as John as a person's given name, Smith as the person's family name, and Acme Corporation as the person's employer, which enabled the database system to identify this dummy entry in the cache in response to the second request for Smith's Acme Corporation record. This dummy entry enables faster responses to requests for data records already determined to be unavailable in the database system, and protects the database system from any potential problems that may be caused by repeatedly accessing the database system's slow-access data store for any database record previously determined to be unavailable.

After accessing the dummy entry stored for the database record in the cache in response to a request, the database system optionally deletes the dummy entry stored for the database record in the cache in response to a count of requests associated with the dummy entry exceeding a deletion threshold, block 126. For example and without limitation, this can include the database system deleting the dummy entry for Smith's Acme Corporation record from the database system's cache after the database system accessed this dummy entry in the database system's cache in response to 1,000 requests for Smith's Acme Corporation record.

This dummy entry deletion enables the database system to check whether any of the database system's hard disk drives has stored Smith's Acme Corporation record since the last 1,000 requests for Smith's Acme Corporation record. This dummy entry protected the database system from any potential problems that might have been caused by accessing the database system's slow-access hard disk drives 1,000 times in response to the last 1,000 requests for Smith's Acme Corporation record, which was previously determined to be unavailable in the database system. Although these examples describe 1,000 requests as the count of requests which resulted in deleting this dummy entry from the database system's cache, this count of requests may be any amount of requests.

After accessing the dummy entry stored for the database record in the cache in response to a request, the database system outputs an alert in response to a count of requests associated with the dummy entry exceeding an alert threshold, block 128. By way of example and without limitation, this can include the database system outputting an alert email to inform a system administrator that the database system accessed the dummy entry stored in the database system's cache for Smith's Acme Corporation record in response to 1,500 requests for Smith's Acme Corporation record. However, the database system does not repeat a similar alert email to the system administrator until 5 minutes later even if the database system receives an additional 1,500 requests for Smith's Acme Corporation record. Waiting any specific amount of time to send an additional alert is referred to as a cool down period, which enables a system administrator to take action on a previous alert without bombarding the system administrator with a seemingly endless supply of alerts while the database system receives an additional 1,500 similar requests. Although these examples describe 1,500 requests as the count of requests which resulted in outputting an alert, this count of requests may be any amount of requests.

Even though this example describes the database system communicating an alert via an email, the database system may communicate an alert via any combination of communications including emails, text messages, display screen updates, audible alarms, social network posts, tweets, writes to database records, etc. Additionally or alternatively, the database system may communicate an alert to a computer system, even the database system itself, in the form of control feedback, such that the computer system receiving the alert can take an action to mitigate an imminent failure. The same or different components of the database system may be responsible for receiving requests, determining what is stored in the cache, determining what is stored in the data store, responding to requests, storing to the cache, deleting from the cache, storing to the data store, and outputting alerts.

The method 100 may be repeated as desired. Although this disclosure describes the blocks 102-128 executing in a particular order, the blocks 102-128 may be executed in a different order. In other implementations, each of the blocks 102-128 may also be executed in combination with other blocks and/or some blocks may be divided into a different set of blocks.

System Overview

Figure 2:
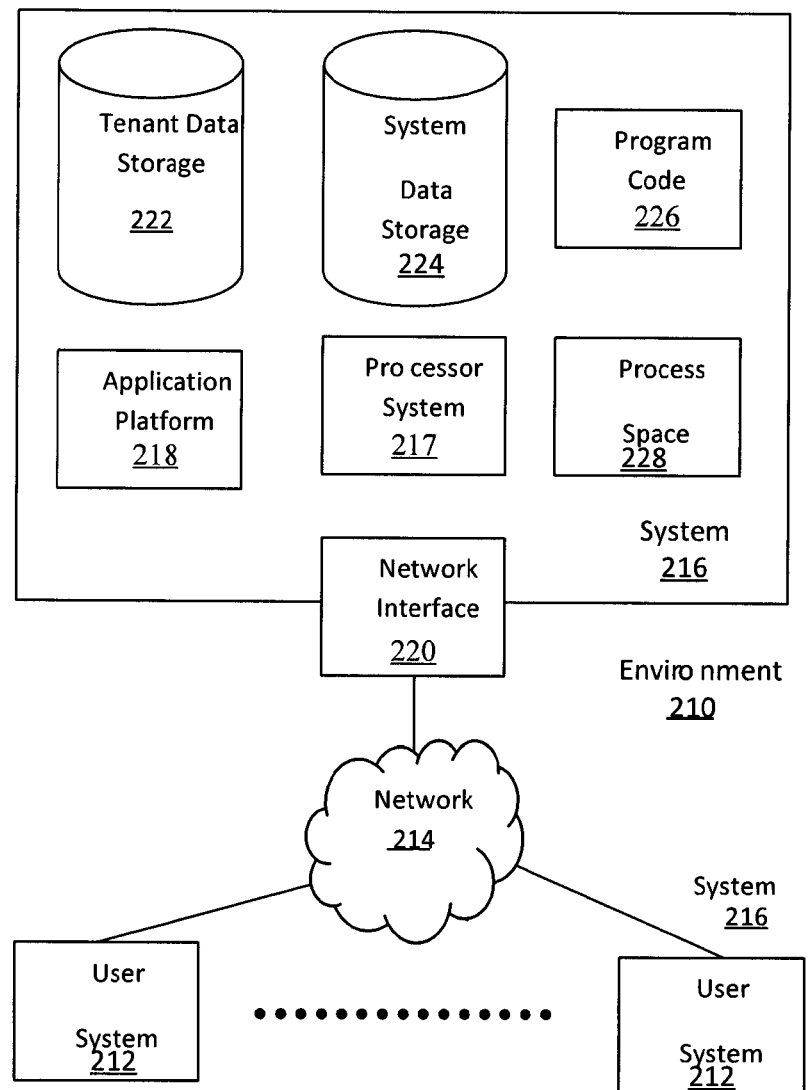
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
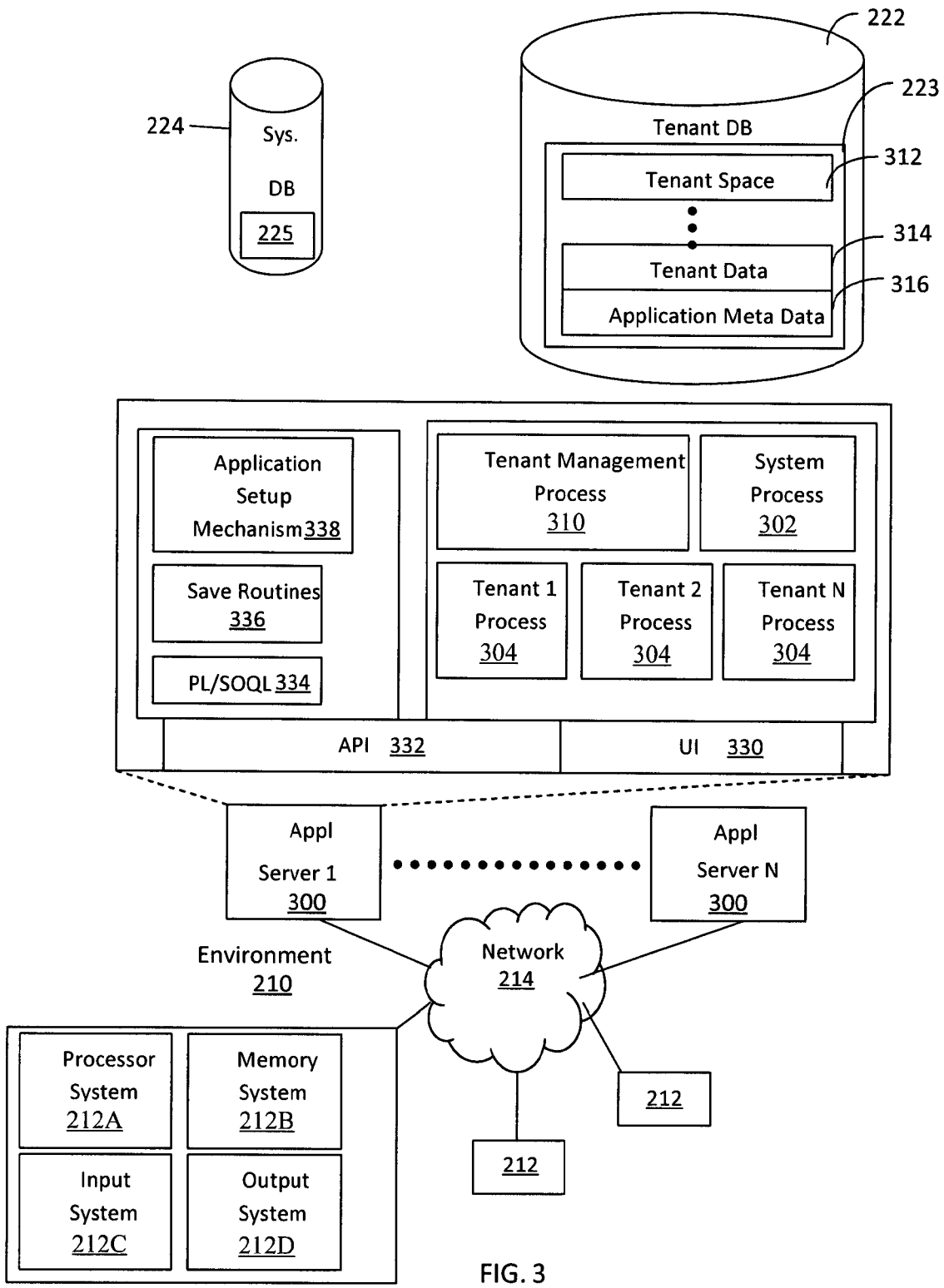
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in reference to FIG. 2. Regarding the user systems 212, the processor system 212A may be any combination of one or more processors. The memory system 212B may be any combination of one or more memory devices, short term, and/or long term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for cache optimization for missing data, the system comprising:
one or more processors; and
a non-transitory computer readable medium storing a plurality of instructions, which when executed, cause the one or more processors to:
receive, by a database system, a first request for a database record;
determine, by the database system, whether the database record is stored in a cache;
determine, by the database system, whether the database record is stored in a data store in response to a determination that the database record is not stored in the cache;
store, by the database system, a dummy entry for the database record in the cache in response to a determination that the database record is not stored in the data store;
receive, by the database system, a second request for the database record;
determine, by the database system, whether the database record is stored in the cache;
output, by the database system, an indication that the database record is unavailable in response to a determination that the dummy entry is stored for the database record in the cache;
replace, by the database system, the dummy entry in the cache with the database record in response to the database record being newly stored in the data store, the dummy entry being replaced in the cache independently of any subsequent request for the database record; and
output, by the database system, the database record newly stored in the cache in response to a subsequent request for the database record; and
output, by the database system, an alert in response to a count of requests associated with the dummy entry exceeding an alert threshold and in response to a determination that an alert notifier is not in a cooldown period for the alert.

2. The system of claim 1, comprising further instructions, which when executed, cause the one or more processors to:
delete, by the database system, the dummy entry stored for the database record in the cache in response to a duration of time elapsing relative to a timestamp associated with the dummy entry.

3. The system of claim 1, comprising further instructions, which when executed, cause the one or more processors to:
delete, by the database system, the dummy entry stored for the database record in the cache in response to a count of requests associated with the dummy entry exceeding a deletion threshold.

4. The system of claim 1, comprising further instructions, which when executed, cause the one or more processors to:
respond, by the database system, to the first request with the database record in response to a determination that the database record is stored in the cache;
respond, by the database system, to the first request with the database record in response to a determination that the database record is stored in the data store; and
respond, by the database system, to the second request with the database record in response to a determination that the database record is stored in the cache.

5. A computer program product comprising computer-readable program code to be executed by one or more processors when retrieved from a non-transitory computer-readable medium, the program code including instructions to:
receive, by a database system, a first request for a database record;
determine, by the database system, whether the database record is stored in a cache;
determine, by the database system, whether the database record is stored in a data store in response to a determination that the database record is not stored in the cache;
store, by the database system, a dummy entry for the database record in the cache in response to a determination that the database record is not stored in the data store;

receive, by the database system, a second request for the database record;

determine, by the database system, whether the database record is stored in the cache;

output, by the database system, an indication that the database record is unavailable in response to a determination that the dummy entry is stored for the database record in the cache;

replace, by the database system, the dummy entry in the cache with the database record in response to the database record being newly stored in the data store, the dummy entry being replaced in the cache independently of any subsequent request for the database record;

output, by the database system, the database record that replaced the dummy entry in the cache in response to a subsequent request for the database record; and output, by the database system, an alert in response to a count of requests associated with the dummy entry exceeding an alert threshold and in response to a determination that an alert notifier is not in a cooldown period for the alert.

6. The computer program product of claim 5, wherein the program code comprises further instructions to:

delete, by the database system, the dummy entry stored for the database record in the cache in response to a duration of time elapsing relative to a timestamp associated with the dummy entry.

7. The computer program product of claim 5, wherein the program code comprises further instructions to:

delete, by the database system, the dummy entry stored for the database record in the cache in response to a count of requests associated with the dummy entry exceeding a deletion threshold.

8. The computer program product of claim 5, wherein the program code comprises further instructions to:

respond, by the database system, to the first request with the database record in response to a determination that the database record is stored in the cache;

respond, by the database system, to the first request with the database record in response to a determination that the database record is stored in the data store; and respond, by the database system, to the second request with the database record in response to a determination that the database record is stored in the cache.

9. A method for cache optimization for missing data, the method comprising:

receiving, by a database system, a first request for a database record;

determining, by the database system, whether the database record is stored in a cache;

determining, by the database system, whether the database record is stored in a data store in response to a determination that the database record is not stored in the cache;

storing, by the database system, a dummy entry for the database record in the cache in response to a determination that the database record is not stored in the data store;

receiving, by the database system, a second request for the database record; determining, by the database system, whether the database record is stored in the cache;

outputting, by the database system, an indication that the database record is unavailable in response to a determination that the dummy entry is stored for the database record in the cache;

replacing, by the database system; the dummy entry in the cache with the database record in response to the database record being newly stored in the data store, the dummy entry being replaced in the cache independently of any subsequent request for the database record;

outputting; by the database system, the database record newly stored in the cache in response to a subsequent request for the database record; and outputting, by the database system, an alert in response to a count of requests associated with the dummy entry exceeding an alert threshold and in response to a determination that an alert notifier is not in a cooldown period for the alert.

10. The method of claim 9, wherein the method further comprises:

deleting, by the database system, the dummy entry stored for the database record in the cache in response to a duration of time elapsing relative to a timestamp associated with the dummy entry; and deleting, by the database system, the dummy entry stored for the database record in the cache in response to a count of requests associated with the dummy entry exceeding a deletion threshold.

11. The method of claim 9, wherein the method further comprises:

storing, by the database system, the database record in the cache in response to the database record being stored in the data store.

12. The method of claim 9, wherein the method further comprises:

responding, by the database system, to the first request with the database record in response to a determination that the database record is stored in the cache;

responding, by the database system, to the first request with the database record in response to a determination that the database record is stored in the data store; and responding, by the database system, to the second request with the database record in response to a determination that the database record is stored in the cache.

* * * * *